United States Patent [19]
Ebuchi et al.

[11] 3,761,055
[45] Sept. 25, 1973

[54] FREEZE SEAL FOR SODIUM VALVES

[75] Inventors: Satoru Ebuchi; Takeo Kazama, both of Kitakyushu, Japan

[73] Assignee: Okano Valve Seizo Kabushiki Kaisha, Kitakyushu, Japan

[22] Filed: Nov. 8, 1971

[21] Appl. No.: 196,459

[52] U.S. Cl. .............................. 251/214, 277/125
[51] Int. Cl. ............................................ F16k 27/00
[58] Field of Search ............... 251/213, 214; 277/1, 277/16, 22, 119, 122, 123, 125, 135, 224, 230, 234, 235; 62/55

[56] References Cited
UNITED STATES PATENTS

| | | | |
|---|---|---|---|
| 564,953 | 7/1896 | Armstrong | 277/125 |
| 1,277,072 | 8/1918 | Hiatt | 277/224 |
| 2,799,522 | 7/1957 | King et al. | 277/16 |
| 3,481,824 | 12/1969 | Poltorak | 277/230 X |
| 3,554,558 | 1/1971 | Rajakovics | 251/214 X |
| 3,559,950 | 2/1971 | Nelson | 251/214 |

Primary Examiner—Martin P. Schwadron
Assistant Examiner—David R. Matthews
Attorney—E. F. Wenderoth et al.

[57] ABSTRACT

A freeze seal for a valve having an elongated stuffing box and a longitudinally movable valve stem extending through the box. A plurality of metallic packings separated by metallic rings are disposed in the box around the valve stem to maintain sodium in the frozen state within the box. Each packing is formed of nickel, nickel base alloy, austenitic stainless steel, aluminum or aluminum base alloy in the form of a thin wire, wool, thin sheet, foil or combinations thereof. It can include two coaxial layers of metallic wool, a metallic foil interposed between them and an outer sheath made of a braid of thin metallic wire.

3 Claims, 3 Drawing Figures

PATENTED SEP 25 1973  3,761,055

SATORU EBUCHI and
TAKEO KAZAMA,
INVENTORS

BY Wendroth Lind & Ponack
ATTORNEYS 3,761,055

FREEZE SEAL FOR SODIUM VALVES

BACKGROUND OF THE INVENTION

This invention relates to improvements in a rod packing device for freeze sealing a valve stem of a valve structure disposed in a cooling system employing sodium as the cooling medium.

In cooling systems employing sodium as the cooling medium, it has heretofore been the practice to prevent the sodium from leaking through around the valve stem of a valve structure disposed in the cooling lines by sealing the valve stem through the freezing of the sodium itself around the valve stem. This measure is commonly called a "freeze sealing system". Conventional freeze sealing systems have utilized the freezing of sodium located in the stuffing box of the associated valve. This has been, however, disadvantageous in that sodium oxide can be precipitated on and stuck to the surface of the valve stem, which causes an increase in the effort to close and open the valve.

SUMMARY OF THE INVENTION

Accordingly it is an object of the invention to provide an improved rod packing device for freeze sealing a valve stem of a valve structure by freezing sodium wherein sodium oxide precipitated on and stuck to the surface of the valve stem is readily removed from the latter thereby to prevent an increase in the effort necessary to close and open the valve structure.

The invention accomplishes this object by the provision of a valve structure for liquid sodium having a rod packing device for freeze sealing a valve stem, said structure comprising a valve body, a finned hollow cylindrical member disposed on the valve body, a valve stem movably extending through both the valve body and the hollow cylindrical member to define an annular cylindrical space within the hollow cylindrical member around that portion thereof disposed in the latter, an amount of sodium in the form of a solid located in the annular cylindrical space, and a plurality of packings and plurality of metallic rings disposed in alternating relationship within the annular cylindrical space of the cylindrical member and around said valve stem, characterized in that each of the packings is formed of a metallic material selected from the group consisting of nickel, nickel base alloys, austenitic stainless steels, aluminum and aluminum base alloys shaped into a thin wire, wool, thin sheet, or foil and combinations thereof.

In a preferred embodiment of the invention, each of the metallic packings may have a multi-layer structure including a pair of coaxial layers of metallic wool, a metallic foil interposed between the two layers, and an outer sheath made of a braid of thin metallic wire to cover the outer one of the pair of metallic wool layers.

BRIEF DESCRIPTION OF THE DRAWING

The invention will become more readily apparent from the following detailed description taken in conjunction with the accompanying drawing in which.

DESCRIPTION OF THE PREFERRED EMBODIMENTS

Figure 1:
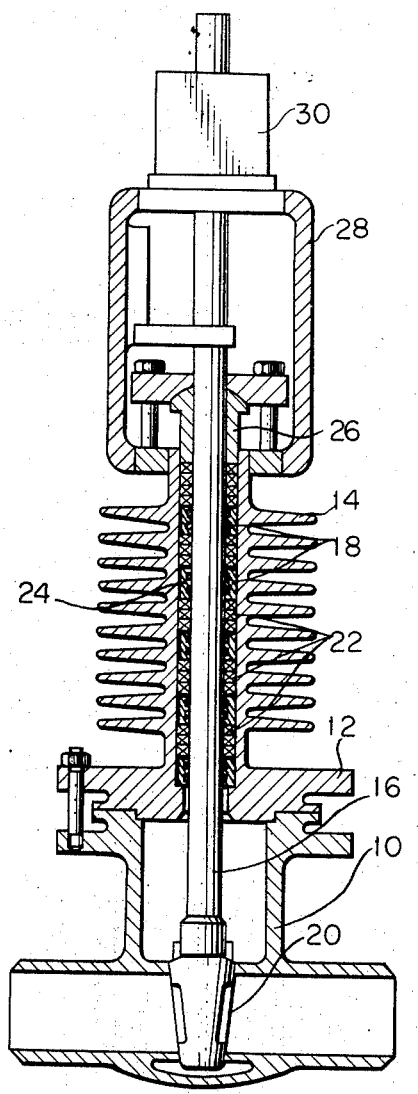
FIG. 1 is a longitudinal sectional view of a valve structure embodying the principles of the invention.

Referring now to FIG. 1 of the drawing, there is illustrated a valve structure constructed in accordance with the principles of the invention. The arrangement illustrated comprises a valve structure including a valve body 10, a valve bonnet or cover 12 rigidly secured to the valve body 10 by bolts and nuts, and a finned hollow cylindrical member 14 integrally protruding from the valve cover 12. The hollow cylindrical member 14 constitutes a stuffing box and has fins adapted to cool the interior thereof. A valve stem 16 loosely extends through the valve body 10 and the valve cover 12 into the interior of the cylindrical member or stuffing box 14 to define an annular cylindrical stuffing space 18 with the interior surface of the stuffing box 14. The valve stem 16 has rigidly secured at one end, in this case, the lower end as viewed in FIG. 1, a valve member 20 adapted to permit and prevent a flow of fluid, in the illustrated example liquid sodium through the valve structure in the manner well known in the art.

Disposed within the annular space 18 in the cylindrical member or stuffing box 14 around the valve stem 16 are a plurality of packings 22 alternating in spaced relationship with a plurality of metallic rings 24. The packings 22 serve to freeze an amount of sodium (not shown) ordinarily located substantially in the lower half as viewed in FIG. 1 of the annular space 18 and to maintain it in its frozen state although the sodium is not illustrated. Then the hollow cylindrical member 14 is closed at the upper open end by a packing gland 26 abutting against the uppermost packing 22 and also connected at the same end to a hollow support block 28. A valve actuator 30 is shown in FIG. 1 as being disposed on the upper surface of the support block 28. The actuator 30 is operatively coupled to an extension of the valve stem 16 slidably protruding through the packing gland 26 into the interior of the support block 28 to effect the longitudinal movement of the valve stem 16 and therefore of the valve plug 20 to open and close the valve structure in a manner well known in the art.

With the valve structure in its open position, liquid sodium serving as a cooling medium will pass through a clearance formed between the raised valve plug and the adjacent portion of the valve body until it climbs the annular space 18 up to about the height thereof. Then the sodium is maintained in its frozen state by the packings 22. Thus the sodium is prevented from further climbing the space.

In conventional freeze sealing devices, sodium oxide was often precipitated on and stuck to that surface of the valve stem located in the stuffing box resulting in an increase in the effort required for moving the valve actuator such as shown at 30 in FIG. 1 to operate the valve stem 16.

The invention contemplates elimination of the disadvantage of the prior art type devices just described.

According to the principles of the invention, the packings 22 are formed of a metallic material selected from the group consisting of nickel, nickel base alloys, austenitic stainless steels, aluminum and aluminum base alloys and in are the form of thin wire, wool, thin sheet, or foil and combinations thereof.

Figure 2:
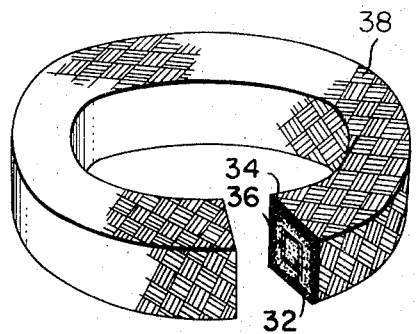
FIG. 2 is a perspective view of a metallic packing constructed in accordance with the principles of the invention.

FIG. 2 shows a preferred structure of the packing 22 in which a square core layer 32 of metallic wool is coaxially enclosed within an outer layer 34 of metallic wool with a metallic foil 36 interposed therebetween. Then an outer sheath 38 made of a braid of thin metallic wire covers the outer layer 34 to complete the formation of a flexible cord having a square cross section. The cord thus formed is cut into predetermined lengths sufficient to be snugly wound around the valve stem with both ends abutting against each other. Then the lengths of cord are fitted onto that portion of the valve stem 16 located in the annular spaces 18 to form the packings 22. As shown in FIG. 1, three or more of the packings 22 are preferably put one above the another.

As an example, the core layer 32 was formed of stainless steel fibers having a diameter of several tens of microns and the outer layer 36 was formed of stainless steel fibers 8 microns in diameter with the braid 38 made of thin wire of Monel metal.

In the arrangement of FIG. 2, the outer sheath 38 is in intimate contact with the adjacent portion of the valve stem 16 thereby to remove sodium oxide and/or solid sodium from the valve stem.

Figure 3:
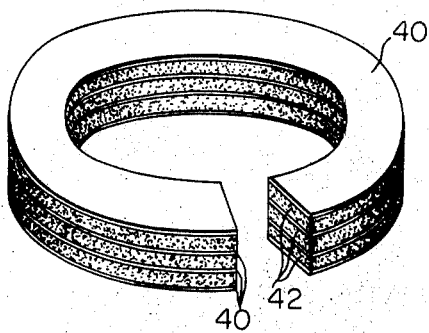
FIG. 3 is a view similar to FIG. 2 but illustrating a modification of the invention.

Alternatively the packings 28 may have a structure as shown in FIG. 3. The arrangement illustrated includes a plurality of thin metallic sheets 40 in the form of circular rings and alternating layers 42 metallic wool in the form of circular rings in a stacked unitary structure. The resulting structure is cut along one radius thereof. The cut rings are fitted onto the valve stem 16 in the same manner as the lengths of cord shown in FIG. 2. Preferably the ring-shaped sheet 40 is Monel metal and the wool layer 42 is of stainless steel fibers 8 microns in diameter. The fibers forming the layer 42 are in intimate contact with the adjacent portion of the valve stem to effectively seal off the liquid sodium.

It is to be noted that the complete sealing is effected by the sodium in its frozen state located in the annular space 18 rather than by the packings 22 themselves. Also it will be understood that the diameter of the metallic fibers are not restricted to the numerical values above specified.

The various components of the packing 22 may be of either similar or dissimilar materials.

The invention has several advantages. For example, the sodium in the form of a solid in the stuffing box can be broken with a low force upon moving the valve stem because the sodium is stuck to the surface of the valve stem in a smaller contact area than in prior art valves as a result of the valve stem being contacted by braided wires, wool and foils forming the metallic packings. Especially, the use of thin metallic wire aids in breaking the frozen sodium while scraping the precipitated sodium oxide stuck to the surface of the valve stem from the latter. That is, the metallic wires has knife edge effect. Because the packing is formed of metallic wool with or without metallic foils, the sodium in its frozen state in the stuffing box is prevented from being forced toward the packing gland with a pressure the same as that of the sodium in the form of a liquid flowing through the valve structure in its open position while maintaining that sodium disposed in the stuffing box. Further the metallic rings interposed between the metallic packings are operative not only to aid in scraping that portion of sodium precipitated on the valve stem from the latter by means of the inner surfaces in the form of wedges (not shown in FIG. 1) but also to maintain the uniformity of fastening forces exerted on the valve stem by the packings.

While the invention has been illustrated and described in conjunction with a few preferred embodiments thereof it is to be understood that numerous changes in the details of construction and the arrangement and combination of parts may be resorted to without departing from the spirit and scope of the invention.

What we claim is:

1. A rod packing device for freeze sealing a valve stem of a valve structure for liquid sodium, comprising in combination, a valve body, a finned hollow cylindrical member disposed on said valve body, a valve stem movably extending through both said valve body and said hollow cylindrical member to define with the inner surface of said cylindrical member an annular cylindrical space within said hollow cylindrical member around that portion thereof disposed in the latter, and a plurality of packings and a plurality of metallic rings disposed in alternating relationship within said annular cylindrical space of said cylindrical member and around said valve stem, each of said packings being a metallic material selected from the group consisting of nickel, nickel base alloys, austenitic stainless steels, aluminum and aluminum base alloys and being in the form of a selected one of thin wire, wool, thin sheet, foil and combinations thereof, whereby when liquid sodium is admitted to said annular cylindrical space during use of the valve structure, it solidifies and seals the stem in the hollow cylindrical member.

2. A rod packing device as claimed in claim 1, wherein each of said packings has a central annular core of metallic wool and an annular covering layer of metallic wool thereover, a metallic foil interposed between said layers, and an outer sheath of a braid of thin metallic wire covering said metallic wool layers.

3. A rod packing device as claimed in claim 2, wherein each of said packings comprises a plurality of thin metallic sheet and alternating layers of metallic wool in stacked relationship.

* * * * *